3,189,597
3-GLYCOSIDES OF 17-AMINO-3-HYDROXY-5-ANDROSTENES

Harold Belding MacPhillamy, Madison, and Robert Armistead Lucas, Mendham, N.J., assignors to Ciba Corporation, a corporation of Delaware
No Drawing. Filed Mar. 4, 1959, Ser. No. 797,040
1 Claim. (Cl. 260—210.5)

The present invention concerns androstane compounds. Particularly, it relates to glycosides of 17-amino-3-hydroxyandrostanes and 17-amino-3-hydroxy-5-androstenes, and the salts thereof, as well as the process for the preparation thereof.

Although the amino group of the 17-position, which may have either the α- or the β-steroconfiguration, may be a secondary amino group, such as, for example, lower alkyl-amino, e.g. methylamino, monocyclic aryl-lower alkyl-amino, e.g. benzylamino, or similar secondary amino groups, it is primarily represented by the primary amino group.

The hydroxyl group in the 3-position may have either α- or, preferably, β-configuration, and androstanes may belong to the 5β- or, primarily, to the 5α-series.

The sugar portion of the glycosides may be those of monosaccharides, such as, for example, pentoses, e.g. arabinose, xylose or ribose, or hexoses, e.g. glucose, galactose, mannose or rhamnose; or of disaccharides, e.g. lactose or maltose.

Salts are specially pharmacologically acceptable acid addition salts, such as those with inorganic acids, e.g. hydrochloric, hydrobromic, sulfuric or phosphoric acid, or with organic acids, e.g. acetic, propionic, tartaric, citric, maleic, hydroxymaleic, benzoic or salicylic acid, and the like.

The new glycosides of this invention and the salts thereof have antihypertensive effects and can be used as antihypertensive agents to relieve states of hypertension. They may, for example, be used as medicaments in the form of pharmaceutical preparations, which contain the new compounds or salts thereof in admixture with a pharmaceutical organic or inorganic, solid or liquid carrier suitable for parenteral administration. For making up the preparations there can be employed substances which do not react with the new compounds, such as water or any other known carrier for medicaments. The pharmaceutical preparations may be liquid form, for example, as solutions. If desired, they may contain auxiliary substances, such as preserving agents, stabilizing agents, wetting or emulsifying agents, salts for varying the osmotic pressure or buffers. They may also contain, in combination, other therapeutically useful substances, for example, other antihypertensive compounds, for example, rauwolfia alkaloids, e.g. reserpine, rescinnamine or deserpidine, synthetic deserpidates, e.g. syrosingopine, veratrum alkaloids, e.g. germine or protoveratrine, synthetic hypotensive compounds, e.g. hydralazine or dihydralazine, or ganglionic blockers, e.g. chlorisondamine.

The compounds of this invention and the salts thereof may be prepared by reacting a 17-amino-3-hydroxyandrostane or a 17-amino-3-hydroxy-5-androstene, in which a primary or secondary amino group present is temporarily protected, with a reactive derivative of a mono- or disaccharide, the hydroxyl groups of which are temporarily protected, and, if desired, converting temporarily protected amino and/or hydroxy groups into free amino and/or hydroxyl groups, respectively, and/or, if desired, removing a double bond extending from the 5-position, and/or, if desired, converting a resulting salt into the free base, and/or, if desired, converting a free base into a salt thereof.

A temporarily protected primary or secondary amino group is particularly an acyl amino group, in which the acyl radical is derived from a strong aliphatic carboxylic acid, such as, for example, a halogeno-lower alkanoic acid, e.g. trichloroacetic, or particularly, trifluoroacetic acid. A temporarily protected amino group may also be a benzyl-substituted amino group, e.g. dibenzylamino.

A reactive derivative of a mono- or disaccharide, the hydroxyl groups of which are temporarily protected and which is capable of forming a glycoside linkage with the hydroxyl group in the 3-position of the androstane or androstene compounds, are particularly halogeno-monosaccharides or halogeno-disaccharides, in which halogen stands for a chlorine or, particularly, for a bromine atom. The free hydroxyl groups of a saccharide are temporarily protected by acyl radicals derived from organic carboxylic acids, such as lower aliphatic carboxylic acids, for example, lower alkanoic acids, e.g. acetic acid or substituted lower alkanoic acids, e.g. trifluoroacetic acid. The reagents of choice are, for example, acetobrom-monosaccharides, such as acetobromglucose or acetobromarabinose, or acetobromdisaccharides.

The reaction is carried out according to conditions known for the preparation of glycosides, for example, in the presence of an alkaline reagent, such as a basic silver compound, e.g. silver oxide or silver carbonate, or an organic tertiary base, e.g. pyridine or quinoline, and in an anhydrous medium. Suitable solvents are inert organic solvents which may be selected according to the solubilities of the reagents; halogenated aliphatic hydrocarbons, e.g. methylene chloride or chloroform, or aromatic hydrocarbons, e.g. benzene or toluene, may be utilized. Silver oxide and silver carbonate represent the preferred condensing agents, which are advantageously used in the presence of a dehydrating agent, such as anhydrous calcium sulfate, and/or with simultaneous azeotropic distillation of a part of the solvent, particularly an aromatic hydrocarbon solvent, to remove any trace of water. The reaction is preferably performed at an elevated temperature, and, if desired, in the atmosphere of an inert gas, e.g. nitrogen.

Any functionally converted amino and/or hydroxyl groups present after the formation of the glycoside bond are converted into the free amino and/or hydroxyl groups. Acylamino groups, particularly halogeno-lower alkanoylamino, e.g. trifluoroacetamino, groups are hydrolized, for example, by treatment with an alkaline reagent, such as aqueous alkali metal hydroxide, e.g. lithium, sodium or potassium hydroxide. An aqueous acidic reagent, such as dilute hydrohalic acid, e.g. hydrochloric acid, may also be used; however, acid reagents may affect the glycoside bond. Any acyloxy, such as a lower alkanoyloxy, e.g. acetoxy, group present in the glycoside portion is hydrolyzed in the presence of an alkaline reagent, such as, for example, an aqueous alkali metal hydroxide, e.g. lithium, sodium or potassium hydroxide. Acylamino and acyloxy groups may be hydrolized simultaneously, for example, by treatment with an aqueous alkali metal hydroxide.

A benzyl radical, as for example, present in a dibenzylamino group, may be removed by hydrogenation under mild conditions, for example, by treatment with hydrogen under atmospheric pressure and in the presence of a catalyst containing a metal of the eighth group of the Periodic System, e.g. palladium black.

The starting materials used in the above reaction are known or, if new, may be prepared according to known procedures. For example, an oxo group present in the 17-position of an androstane or 5-androstene derivative may be converted into the corresponding oxime by treatment with hydroxylamine or an acid addition salt thereof. A resulting oximino compound is then reduced to the corresponding 17-amino-derivatives, in which the amino group is either in the α- or in the β-position, whereby the configuration of the resulting amino group may depend primarily on the type of reduction used. Such reduction may be carried out under acidic conditions, for example, by treatment with hydrogen in the presence of a catalyst containing a metal of the eighth group of the Periodic System, e.g., platinum oxide, and an acid, such as a lower alkanoic acid, e.g. acetic acid, or treatment of an acid, e.g. acetic acid, solution of the starting material with a metal, e.g. zinc. It may also be performed under alkaline conditions, for example, by treatment of a lower alkanol, e.g. methanol, ethanol, propanol or butanol, solution of the starting material with an alkali metal, e.g. sodium, or by treatment of the starting material with an alkali metal aluminum hydride, e.g. lithium aluminum hydride, in an inert solvent. Any double bond extending from the 5-position in an androstene compound may be hydrogenated simultaneously with the oxime, particularly if a catalytic hydrogenation procedure is employed.

The starting materials may also be prepared from the corresponding 17-carboxylic acids, for example, by a Curtius degradation, which involves conversion of the acid to the acid chloride and then to the azide, which is subsequently rearranged to the desired amine by treatment with acetic acid.

Secondary amino groups may be formed from primary amino groups, for example, by converting the latter to acylamino groups, such as lower alkanoylamino, e.g. acetylamino, and reducing the amide to the desired amine by reduction, for example, with lithium aluminum hydride, or by forming a Schiff base of the primary amine with an aldehyde, e.g. benzaldehyde, and reducing the resulting imino compound, for example, with sodium borohydride.

Any double bond in the 5-position of a resulting 17-amino-3-hydroxy-5-androstene may be removed according to known procedures, for example, by hydrogenation in the presence of a catalyst containing a metal of the eighth group of the Periodic System, such as, for example, platinum oxide, preferably in solution with an acid, such as a lower alkanoic acid, e.g. acetic acid.

A modification of the above procedure for the manufacture of the compounds of this invention comprises converting a 3-glycoside of 3-hydroxy-androstan-17-one or a 3-glycoside of 3-hydroxy-5-androsten-17-one into the corresponding 3-glycoside of 17-amino-3-hydroxy-androstanes and 3-glycoside of 17-amino-3-hydroxy-5-androstenes, respectively, and, if necessary, hydrolyzing any esterified hydroxyl groups, and, if desired, carrying out the optional steps.

This procedure may be carried out by converting a 3-glycoside of 3-hydroxy-androstan-17-one or a 3-glycoside of 3-hydroxy-5-androsten-17-one into the corresponding oximes and reducing the resulting oximes to the desired 17-amino compounds. Preferably, 3-glycosides of the above-described androstanes and androstenes may be used, in which the hydroxyl groups of the glycoside portion are acylated, preferably with a lower alkanoic acid, e.g. acetic acid.

The oxime may be obtained by treatment of the starting materials with hydroxylamine or an acid addition salt thereof, particularly with a mineral acid, e.g. hydrochloric or sulfuric acid. The oximation reaction may preferably be carried out in the presence of a solvent, which, if desired, may be simultaneously an acid neutralizing agent, such as an organic tertiary base, e.g., pyridine or collidine.

The reduction of a resulting oximino compound to an amine may be carried out according to conventional procedures. Catalytically activated hydrogen, such as hydrogen in the presence of a catalyst containing a metal of the eighth group of the Periodic System, for example, platinum oxide, in the presence of a solvent, e.g. acetic acid, or nascent hydrogen as, for example, formed upon reacting a lower alkanol, e.g. ethanol, n-propanol, n-butanol, etc., with an alkali metal, e.g. sodium or potassium, are the preferred reduction procedures.

Any resulting glycoside, in which the hydroxyl groups of the glycoside position are acylated, may be hydrolized as previously described.

The starting material used in the above reaction may be prepared, for example, according to the previously described procedure for the preparation of glycosides.

The new glycosides may be obtained in the form of the free bases or as the salts thereof. A salt may be converted into the free base, for example, by reaction with an aqueous alkaline reagent, such as, an alkali metal hydroxide, e.g. lithium, sodium or potassium hydroxide; or ammonia. A free base may be transformed into its therapeutically useful acid addition salts by reaction with an appropriate inorganic or organic acid, such as, the acids mentioned hereinbefore, for example, by treating a solution of the base in an alcohol, e.g. methanol or ethanol, with the acid or a solution thereof.

The following examples illustrate the invention; they are not to be considered as being limitations thereon. Temperatures are given in degrees centigrated.

*Example 1*

A solution of 2 g. of 3β-hydroxy-17ξ-trifluoroacetyl-amino-5α-androstane in 125 ml. of dry chloroform is stirred for 24 hours at room temperature with 5 g. of silver oxide, 5 g. of D-acetobromglucose and 5 g. of pulverized anhydrous calcium sulfate. The reaction mixture is filtered, the filtrate is concentrated under reduced pressure and the residue crystallized from ethanol. The 3-D-β-tetraacetyl-glucoside of 3β-hydroxyl-17ξ-trifluoroacetyl-amino-5α-androstane melts at 227–229.5° after recrystallization from ethanol.

A mixture of 1.27 g. of 3-D-β-tetraacetyl-glucoside of 3β-hydroxyl-17ξ-trifluoroacetyl-amino-5α-androstane, 20 ml. of ethanol, 2 ml. of water and 1 g. of potassium hydroxide is refluxed for 3 hours. The solution is poured into ice-water and the resulting white crystalline precipitate, representing 3-D-β-glucoside of 17-ξ-amino-3β-hydroxy-5α-androstane, M.P. 225–260°, is filtered off. The crystals are dissolved in a small amount of ethanol containing a few drops of water and 3 drops of concentrated hydrochloric acid. The hydrochloride of the 3-D-β-glucoside of 17ξ-amino-3β-hydroxy-5α-androstane is filtered off and washed with ethanol, M.P. >300°.

The starting material used in the above reaction may be prepared as follows: A solution of 10 g. of 3β-hydroxy-5-androsten-17-one in 150 ml. of hot absolute ethanol is treated with a solution of 2.78 g. of hydroxylamine hydrochloride in a minimum amount of hot water, followed by a solution of 3.28 g. of anhydrous sodium acetate in a minimum amount of hot water. The mixture is refluxed for 2 hours, then cooled and diluted with 350 ml. of cold water. The mixture is chilled, filtered and the white crystalline 3β-hydroxy-17-oximino-5-androstene is washed with water, M.P. 198–200°.

A hot solution of 11.3 g. of 3β-hydroxy-17-oximino-5-androstene in 830 ml. of glacial acetic acid is cooled and treated with hydrogen at atmospheric pressure and in the presence of 2 g. of platinum oxide. The catalyst is filtered off, the filtrate is concentrated to dryness under reduced pressure, the residue is dissolved in warm methanol and the resulting solution is made basic with dilute aqueous sodium hydroxide. The crystalline 17ξ-amino-3β-hydroxy-5α-androstane is filtered off and recrystallized from aqueous methanol, M.P. 163–164.5°.

4.16 g. of 17ξ-amino-3β-hydroxy-5α-androstane is dissolved in 35 ml. of dry pyridine and 7 ml. of trifluoroacetic acid anhydride added. The solution is allowed to stand at room temperature for two hours and is then poured into cold water. The yellow gum crystallizes with stirring, the crystals are filtered off, dissolved in ether and the ether solution is washed with dilute aqueous hydrochloric acid and water. On concentration it yields 6.8 g. of yellow crystals, which are dissloved in 350 ml. of ethanol, to which solution 13.6 g. of potassium hydrogen carbonate in 175 ml. of water is added. After standing at room temperature for forty-eight hours, water is added and the crystalline material is filtered off, M.P. 199–201°. The 3β-hydroxy-17ξ-trifluoroacetyl-amino-5α-androstane is recrystallized from aqueous ethanol, M.P. 202–205°; yield: 3.67 g.

Example 2

6.9 g. of 3β-hydroxy-17ξ-trifluoroacetyl-amino-5-androstene in 200 ml. of dry chloroform is stirred for twenty-four hours at room temperature with 13.9 g. of D-acetobromglucose, 13.9 g. of silver oxide and 13.9 g. of anhydrous calcium sulfate. The mixture is filtered, the filtrate is concentrated to dryness under reduced pressure and the resulting gum is dissolved in hot methanol. The solution is allowed to stand at room temperature overnight, whereupon 4.5 g. of the 3-D-β-tetraacetyl-glucoside of 3β-hydroxy-17ξ-trifluoroacetyl - amino - 5 - androstene crystallizes, M.P. 204–208°. The mother liquors yield additional 2 g. of the desired product.

4.5 g. of the 3-D-β-tetraacetyl-glucoside of 3β-hydroxy-17ξ-trifluoroacetyl-amino-5-androstene is refluxed for three hours with 50 ml. of ethanol, 10 ml. of water and 10 g. of potassium hydroxide. The reaction mixture is poured into cold water, and the white crystalline 3-D-β-glucoside of 17ξ-amino-3β-hydroxy-5-androstene precipitates, M.P. 276° (with decomposition).

The above-free base is suspended in a 1:1-mixture of ethanol and water and a 1:1-mixture of concentrated hydrochloric acid and water is added until the mixture is acid to Congo-red. The mixture is heated, whereupon the solid material dissolves. The hydrochloride salt of 3-D-β-glucoside of 17ξ-amino-3β-hydroxy-5-androstene precipitates on cooling and is recrystallized from a mixture of ethanol and water, M.P. >300°.

The starting material used in the above reaction may be prepared as follows: 41 g. of 3β-hydroxy-17-oximino-5-androstene in 1500 ml. of absolute ethanol is stirred and refluxed while 65 g. of sodium is added. After completion of the reaction, the solution is concentrated under reduced pressure, the residue is diluted with water and extracted with ethyl acetate. The extract is washed with water, concentrated to one-half its volume, dried over sodium sulfate, then treated with about 250 ml. of dry hydrogen chloride in ether, to yield 16 g. of 17ξ-amino-3β-hydroxy-5-androstene hydrochloride. An additional amount of 11.3 g. is recovered from the mother liquors.

The hydrochloride salt is dissolved in a warm 1:1-mixture of water and ethanol and the solution is made basic with dilute sodium hydroxide; the resulting 17ξ-amino-3β-hydroxy-5-androstene melts at 161–164°.

11.6 g. of the 17ξ-amino-3β-hydroxy-5-androstene is dissolved in 94 ml. of dry pyridine and 30 g. of trifluoroacetic acid anhydride is carefully added portion-wise. The solution is allowed to remain at room temperature for two hours, and is then poured into a mixture of ice and water. The crystalline material is filtered off, dissolved in ether, the ether solution is washed with dilute hydrochloric acid and water to remove all traces of pyridine. The organic solution is concentrated to dryness, and the residue is dissolved in 720 ml. of ethanol. A solution of 28.8 g. of potassium hydrogen carbonate in 360 ml. of water is added and the mixture is allowed to stand at room temperature for two days. It is diluted with water, extracted with ether, the extract is washed with water, dried over sodium sulfate and concentrated to dryness in vacuo. 11.2 g. of 3β-hydroxy-17ξ-trifluoroacetyl-amino-5-androstene is recovered, M.P. 222–227°.

Example 3

A mixture of 7.7 g. of 3β-hydroxy-5α-androstan-17-one, 18 g. of silver oxide, 18 g. of anhydrous calcium sulfate and 18 g. of D-acetobromarabinose in 150 ml. of dry chloroform is stirred for three days at room temperature. The silver salts are filtered off, the filtrate is evaporated under reduced pressure and the syrupy residue is dissolved in ethanol. The solution is diluted with water, and the solvent is decanted from the resulting oil. The remaining oil is heated under reduced pressure to remove traces of chloroform and is then dissolved in acetone. Water is added and the resulting oil, from which the liquid is separated, is dissolved in methanol. Again, water is given to the alcoholic solution and a sticky solid separates which is dissolved in hot ethanol; water is added to turbidity, whereupon a crystalline material is formed on standing, which is filtered off and washed with aqueous ethanol and then with ether to yield 3.5 g. of the 3-D-β-tetraacetyl-arabinoside of 3β-hydroxy-5α-androstan-17-one, M.P. 186°. An additional 5.5 g. can be obtained from the washing liquors.

A mixture of 3 g. of 3-D-β-tetraacetyl-arabinoside of 3β-hydroxy-5α-androstan-17-one and 0.6 g. of hydroxylamine hydrochloride in 30 ml. of pyridine is heated on the steam bath for six hours and then poured into water. A white precipitate is formed, which is filtered off and washed with water. The 17-oximino derivative, used without further purification, is dissolved in 30 ml. of glacial acetic acid and hydrogenated in the presence of 0.75 g. of platinum oxide at atmospheric pressure and room temperature. The hydrogenation is complete after one hour, stirring is continued for an additional hour and the mixture is filtered. The catalyst is washed with water and acetic acid. 50 ml. of aqueous ammonia is added to the ice-water cooled filtrate; a solid material separates which is filtered off and washed with water to yield 2.56 g. of 3-D-β-tetraacetyl-arabinoside of 17ξ-amino-3-β-hydroxy-5α-androstane, M.P. 100–105°.

To a solution of 2 g. of 3-D-β-tetraacetyl-arabinoside of 17ξ-amino-3β-hydroxy-5α-androstane in 10 ml. of warm methanol is added 28 drops of a methanolic barium methoxide solution (prepared by adding an excess of barium oxide to methanol and using the supernatant liquid). The mixture is heated for fifteen minutes on the steam bath, and a small amount of methanol and water is then added to a total volume of 40 ml. and a pH of about 8. The solid material is filtered off, washed on the filter with water and extracted with 50 ml. of ethanol containing several drops of aqueous hydrochloric acid. The extract is filtered, the filtrate is evaporated on the steam bath in the atmosphere of nitrogen to leave a white crystalline material as a residue. The solid material, remaining after the filtration, is re-extracted in the same way and the two crops are combined to yield 0.68 g. of 3-D-β-arabinoside of 17ξ-amino-3β-hydroxy-5α-androstane, M.P. 235° (decomposition). From the mother liquors a second crop of 0.35 g., having the same melting point, can be obtained.

The 3β-hydroxy-5β-androstan-17-one may replace the starting material in the above example to yield the 3-D-β-arabinoside of 17ξ-amino-3β-hydroxy-5β-androstane.

Other acetobrom-monosaccharides, such as, for example, acetobromgalactose or acetobromrhamnose, or acetobrom-disaccharides, for example, acetobromlactose, may be reacted according to the previously outlined procedure with 3-hydroxy-androstanes or 3-hydroxy-5-androstenes, which contain in the 17-position a temporarily protected primary or secondary amino group, to yield the corresponding 3-O-acetylated glycosides. Or, 3-O-acetylated glycosides of 3-hydroxy-androstan-17-one or 3-hydroxy-5-androsten-17-one with other monosaccharides than those previously described, e.g. galactose or rhamnose, or disaccharides, e.g. lactose, may be reacted with hydroxylamine or a salt, e.g. sulfate, thereof, and the resulting oximino compound may then be converted into the desired 17-amino-derivative by reduction.

What is claimed is:
3-D-$\beta$-glycoside of 17-amino-3$\beta$-hydroxy-5-androstene.

References Cited by the Examiner
UNITED STATES PATENTS
2,561,378    7/51   Julian _____ 260—210.5

FOREIGN PATENTS
52,130    2/42   Netherlands.

LEWIS GOTTS, *Primary Examiner.*
A. H. WINKELSTEIN, T. E. LEVOW, *Examiners.*